(12) United States Patent
O'Toole et al.

(10) Patent No.: US 12,072,125 B2
(45) Date of Patent: Aug. 27, 2024

(54) SYSTEM AND METHOD FOR MAXIMISING HEAT OUTPUT AND TEMPERATURE DELTA IN A SMA HEAT PUMP/REFRIGERATION SYSTEM

(71) Applicant: EXERGYN LTD., Dublin (IE)

(72) Inventors: Kevin O'Toole, Dublin (IE); Keith Warren, Dublin (IE)

(73) Assignee: EXERGYN LTD., Dublin (IE)

( * ) Notice: Subject to any disclaimer, the term of this patent is extended or adjusted under 35 U.S.C. 154(b) by 0 days.

(21) Appl. No.: 17/632,127

(22) PCT Filed: Aug. 1, 2020

(86) PCT No.: PCT/EP2020/071745
§ 371 (c)(1),
(2) Date: Feb. 1, 2022

(87) PCT Pub. No.: WO2021/023680
PCT Pub. Date: Feb. 11, 2021

(65) Prior Publication Data
US 2022/0275980 A1    Sep. 1, 2022

(30) Foreign Application Priority Data
Aug. 2, 2019 (GB) ...................................... 1911073

(51) Int. Cl.
F25B 23/00    (2006.01)
(52) U.S. Cl.
CPC .................................... F25B 23/00 (2013.01)
(58) Field of Classification Search
CPC ........ F25B 23/00; F25B 30/00; F03G 7/0614; F03G 7/062; F03G 7/0646
See application file for complete search history.

(56) References Cited

U.S. PATENT DOCUMENTS

| 4,353,218 A | 10/1982 | Wheatley et al. |
| 10,018,385 B2 | 7/2018 | Radermacher et al. |

(Continued)

FOREIGN PATENT DOCUMENTS

| CN | 106052190 A | 10/2016 |
| CN | 107289668 A | 10/2017 |

(Continued)

OTHER PUBLICATIONS

Machine English language translation of JP 2015068604 to Daikin Ind Ltd (translated Sep. 2023) (Year: 2015).

(Continued)

*Primary Examiner* — Lionel Nouketcha
(74) *Attorney, Agent, or Firm* — Nixon Peabody LLP (57) ABSTRACT

The invention provides a heat pump system and method comprising a first Shape-Memory Alloy (SMA) or Negative Thermal Expansion (NTE) elastocaloric core positioned in a housing and adapted to absorb heat and store energy in response to a first fluid inputted at a first temperature. The housing is configured to receive the first fluid at a first temperature via an inlet to cause the first SMA or NTE elastocaloric core to change state. A device is configured to apply stress on the first SMA or NTE core in the housing to cause the SMA or NTE elastocaloric core to change state, releasing heat/energy and causing the SMA/NTE to heat up. A second fluid at a higher temperature is inputted and then subsequently heated further as a result of heat transfer. A second Shape-Memory Alloy (SMA) or Negative Thermal Expansion (NTE) or elastocaloric core is positioned in a cascade arrangement with the first core, but exhibiting a higher activation temperature. The higher temperature fluid leaving core 1 is inputted into core 2, resulting in a larger net temperature lift than could be achieved with a single core. In the alternative, in a cooling system, to achieve a lower (Continued)

temperature drop, the second core in the cascade can exhibit a lower activation temperatures than the first core. The cycle focus is on the endothermic stress release component where the SMA/NTE/elastocaloric core absorbs energy from the fluid. The first core results in a fluid stream drop and that then enters the second core with lower activation temperatures, resulting in a further drop of the output fluid during the cooling half of the cycle.

13 Claims, 5 Drawing Sheets

(56) References Cited

U.S. PATENT DOCUMENTS

| | | |
|---|---|---|
| 11,454,429 B2 | 9/2022 | Bartholome et al. |
| 11,656,008 B2 | 5/2023 | Langan et al. |
| 2016/0084544 A1 | 3/2016 | Radermacher et al. |
| 2016/0208783 A1 | 7/2016 | Cullen et al. |
| 2022/0299243 A1 | 9/2022 | O'Toole et al. |

FOREIGN PATENT DOCUMENTS

| | | |
|---|---|---|
| CN | 107421096 A | 12/2017 |
| EP | 3317535 B1 | 5/2018 |
| GB | 2497542 A | 6/2013 |
| GB | 2533357 A | 6/2016 |
| JP | 2015068604 | 4/2015 |
| WO | 2014198904 A1 | 12/2014 |
| WO | 2017001521 A1 | 1/2017 |
| WO | 2018229231 A1 | 12/2018 |
| WO | WO-2018229231 A1 * | 12/2018 |

OTHER PUBLICATIONS

Machine English language translation of CN 106052190 B to Xi'an Jiaotong Univ (Year: 2016).

* cited by examiner

SYSTEM AND METHOD FOR MAXIMISING HEAT OUTPUT AND TEMPERATURE DELTA IN A SMA HEAT PUMP/REFRIGERATION SYSTEM

CROSS-REFERENCE TO RELATED APPLICATIONS

This application is a 35 U.S.C. § 371 National Phase Entry Application of International Application No. PCT/EP2020/071745 filed Aug. 1, 2020, which designates the U.S. and claims benefit under 35 U.S.C. § 119(a) of GB Application No. 1911073.3 filed Aug. 2, 2019, the contents of which are incorporated herein by reference in their entireties.

FIELD

This disclosure relates to a heat pump. In particular this disclosure relates to a heat pump for heating systems and/or cooling systems such as an air conditioning system.

BACKGROUND

Heat Pump ("HP") technologies have gained wide commercial acceptance in heating, ventilation & air conditioning ("HVAC") applications. They can offer energy savings and emissions reductions and are typically installed for heating and cooling systems in buildings or car applications etc.

There are several types of heat pump. Most existing technologies utilise a refrigerant in an expansion/compression cycles, many heat pumps are classified by the source of the heat e.g. air source heat pump or ground source heat pump. The fundamental technology used in the heat pump is similar. Air source heat pumps have limited performance in cold temperature (at −18° C., CoP tends to be around 1 (due to Carnot) so electrical resistance heating is more effective, at higher operating temperatures the CoP can reach 4). Ground Source heat pumps have more stable inlet temperature but are limited by the Coefficient of Performance ("CoP") of present technology.

There is a global need to decarbonise heating and cooling in buildings. Heating generally uses combustion of carbon-based fuel, which releases carbon into the atmosphere. Cooling and air conditioning can be a major electrical load in warmer climates. Heat pumps can potentially deliver heating and cooling from a single package. If a heat pump uses renewable electricity, then the heat pump can be a zero-emission technology. Current heat pump technologies generally use refrigerants with high global warming potential and can have high toxicity, which is undesirable. Fans and pumps have a noise signature which can be intrusive.

Current HP technology has a CoP of 3 to 4. By increasing the CoP, electricity consumption can be reduced, this reduces carbon emissions if non-renewable electricity is used. Moreover, conventional HP technologies can have a CoP which is affected by ambient air temperature which is undesirable. US Patent publication number US20160084544, Radermacher et al, discloses a heat pump system that uses SMA material tubes, where the are filled with other tubes or rods of an unknown material to take up volume and to therefore remove dead thermal mass to help boost he efficiency of the system. However, a problem with this configuration is that they are thermally inefficient and do not expand and/or contract uniformly and the CoP values generated are poor.

It is therefore an object to produce a heat pump system that produces a large increase in Coefficient of Performance (CoP). It is another object to provided an improved cooling system.

SUMMARY

According to the invention there is provided, as set out in the appended claims, a heat pump system comprising
a first Shape-Memory Alloy (SMA) or Negative Thermal Expansion (NTE) or elastocaloric core positioned in a housing and adapted to absorb heat and/or store energy in response to a first fluid inputted at a first temperature. This has a net cooling effect on the first input fluid as it leaves the core. The energy can be stored or released immediately or at a desired frequency depending on the application required;
the housing is configured to receive the first fluid at a first temperature via an inlet to cause the first SMA or NTE core to change state;
a device is configured to apply stress on the first SMA or NTE core in the housing to cause the SMA or NTE core to undergo a phase change and exothermically release heat/energy. This causes the SMA or NTE core to increase in temperature. A second fluid at a second temperature (or the continuation of the first fluid at the first temperature in certain cases) is then inputted to the core, and energy/heat from the heated SMA or NTE core is transferred in to the fluid. This has a net heating effect as the fluid leaves the core; and
a second Shape-Memory Alloy (SMA) or Negative Thermal Expansion (NTE)/elastocaloric core positioned in a cascade arrangement with the first core and configured to change state in response to the fluid temperature exiting the first core. The stress cycle is then repeated in the second core resulting in an additional net heating effect (i.e. increasing the temperature) on the second fluid as it exits the second core.

Conversely, in a cooling or refrigeration system, to achieve a lower temperature drop, the second core in the cascade can exhibit a lower activation temperatures than the first core. The cycle focus is on the endothermic stress release component where the SMA/NTE/elastocaloric core absorbs energy from the fluid. The first core results in a fluid stream temperature drop and that then enters the second core with lower activation temperatures, resulting in a further temperature drop of the output fluid during the cooling half of the cycle.

It will be appreciated that the core can comprise any suitable elastocaloric material such as Nickel Titanium alloy or derivatives NiTiX or NiTiXY where X & Y are tertiary/quaternary alloying elements, NiMnGa CuAlZn.

The problem that is solved by the present invention is a heat pump that can exhibit a substantially higher temperature delta (deltaT) than other prior art heat pump systems. The invention contributes towards increased thermal output and increased system efficiency/CoP of an SMA/solid state heat pump. The SMA heat pump/refrigeration cycle can be considered as a hybrid between a reverse Brayton and reverse Stirling cycle. At higher deltaTs, it is more like a reverse Brayton cycle and a lower deltaTs it is more like a reverse Stirling. Therefore, since a reverse Stirling is a more efficient cycle, it is best to operate the heat pump as close to this cycle as possible. By employing a cascade system and positioning two or more cores in series, the deltaTs required form each stage are reduced. This means the system is more reverse Stirling like in its behaviour. The exergetic efficiency is also higher due to the fact that there is more energy available in the SMA to heat the fluid than there would be with larger deltaTs.

In one embodiment the second core is arranged in series with the first core provides a temperature lift during a heating cycle.

In one embodiment the second core is arranged in series with the first core provides a temperature drop during a cooling cycle.

In one embodiment the second core comprises a higher activation temperature compared to the first core.

In one embodiment the second fluid comprises a tertiary circuit fluid.

In one embodiment the stress applied is a compression stress.

In one embodiment the first core changes state the second fluid temperature increases such that the second core changes state to increase the temperature of the second fluid.

In one embodiment a third Shape-Memory Alloy (SMA) or Negative Thermal Expansion (NTE) or elastocaloric core positioned in a cascade arrangement with the first core and the second core. It will be appreciated that the heat pump/cooling system can operate with any number of cores in a stacked or cascaded staged arrangement.

In another embodiment there is provided a cooling system comprising:
  a first Shape-Memory Alloy (SMA) or Negative Thermal Expansion (NTE) or elastocaloric core positioned in a housing and adapted to absorb heat and store energy in response to a first fluid inputted at a first temperature resulting in a net cooling effect in the fluid as it leaves the core;
  the housing is configured to receive the first fluid at a first temperature via an inlet to cause the first SMA or NTE or elastocaloric core to change state at an activation temperature; and
  a second Shape-Memory Alloy (SMA) or Negative Thermal Expansion (NTE) or elastocaloric core positioned in a cascade arrangement with the first core and configured to change state in response to the cooled fluid from the first core, wherein the activation temperature of the second core is lower that the activation temperature of the first core.

In another embodiment there is provided a cooling method, the method comprising the steps of:
  positioning a first Shape-Memory Alloy (SMA) or Negative Thermal Expansion (NTE) or elastocaloric core in a housing and adapting to absorb heat and store energy in response to a first fluid inputted at a first temperature resulting in a net cooling effect in the fluid as it leaves the core;
  configuring the housing to receive the first fluid at a first temperature via an inlet to cause the first SMA or NTE or elastocaloric core to change state at an activation temperature; and
  positioning a second Shape-Memory Alloy (SMA) or Negative Thermal Expansion (NTE) or elastocaloric core in a cascade arrangement with the first core and configuring to change state in response to the cooled fluid from the first core, wherein the activation temperature of the second core is lower that the activation temperature of the first core.

In another embodiment there is provided a heating method, the method comprising the steps of:
  positioning a first Shape-Memory Alloy (SMA) or Negative Thermal Expansion (NTE) or elastocaloric core in a housing and adapting to absorb heat and store energy in response to a first fluid inputted at a first temperature resulting in a net cooling effect in the fluid as it leaves the core;
  configuring the housing to receive the first fluid at a first temperature via an inlet to cause the first SMA or NTE or elastocaloric core to change state;
  configuring a device to apply stress on the first SMA or NTE core in the housing to cause the SMA or NTE elastocaloric core to undergo a phase change and exothermically release heat/energy;
  inputting a second fluid at a second temperature, or the first fluid at the first temperature, to the core, and energy/heat from the heated SMA or NTE or elastocaloric core is transferred to heat the fluid; and
  positioning a second Shape-Memory Alloy (SMA) or Negative Thermal Expansion (NTE) or elastocaloric core in a cascade arrangement with the first core and configured to change state in response to the heated fluid from the first core.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The invention relates to a new heat pump cycle which utilises the latent heat from a phase transformation of shape memory alloys ("SMA") or Negative Thermal Expansion materials (NTE) or elastocaloric materials. The following description of a preferred embodiment of the invention describes a SMA implementation and equally applies to Negative Thermal Expansion materials (NTE) or elastocaloric material implementations.

The invention can use a particular SMA configuration made up of a plurality of elements or wires packed closely together to define a core. SMA material can exist in two crystalline states, martensite and austenite, and can be reversibly converted from one phase to the other. The austenite to martensite transition of SMA is exothermic. The martensite to austenite transition is endothermic. The temperatures at which the phase change occurs can be manipulated via the application of stress to the SMA material.

A Shape-memory Alloy (SMA) is an alloy that exhibits a shape memory effect which once deformed returns to its pre-deformed shape upon heating. This material is a lightweight, solid-state alternative to conventional actuators such as hydraulic, pneumatic, and motor-based systems.

The invention relates to a heat pump system and method which can use either Shape-Memory Alloys (SMAs) or Negative Thermal Expansion materials (NTE) or elastocaloric material. In one embodiment a particular SMA system made up of SMA material can be used. For example a plurality of elements (or a plurality of groups of elements) or wires packed closely together to define a core. In another example the core can be made up of one or more of the following rod, block, ribbon, strip or plates, 3D printed elements and the like all capable of being subjected to compression, axially or laterally, compression and natural loading, torsional stress to function as a core.

A heat pump has two individual phases—heat absorption and heat release. The machine cycle is defined as a full heat absorption phase (endothermic) and a full heat release phase (exothermic).

The heat absorption phase allows for the transfer of heat into the SMA material by setting the stress applied to the material to an appropriate value, the lower value used in the cycle of operation. This results in the activation temperatures, Austenite start ($A_s$) and Austenite finish ($A_f$), being set to a value below the input temperature of fluid stream. The thermal gradient present therefore allows the heat to transfer into the SMA via conduction and convection. Once the material has fully or partially transformed to austenite (i.e. the temperature of the SMA material is above $A_f$), the heat absorption phase is complete.

The heat release phase begins after increasing the stress on the austenitic SMA material. This raises the activation temperatures, Martensite start ($M_s$) and Martensite finish ($M_f$), for the reverse transformation back to martensite. Once the value of $M_s$ is raised above the input fluid stream temperature, the reverse transformation begins. It will only complete in full when $M_f$ also raised above the fluid stream temperature. The latent heat is then released by the SMA material and into the fluid stream, raising its temperature. The rate at which the release of heat occurs is a function of the thermal gradient and various thermodynamic conditions of the fluid stream, such as flow rate, turbulence etc.

A single fluid temperature input can be used in the system, and a series of valves can be used at the output of the chamber to direct the colder fluid flow from the heat absorption phase back to source, while directing the warmer fluid from the heat release phase to the heating target. Multiple working fluid temperature inputs can also be used.

Figure 1:
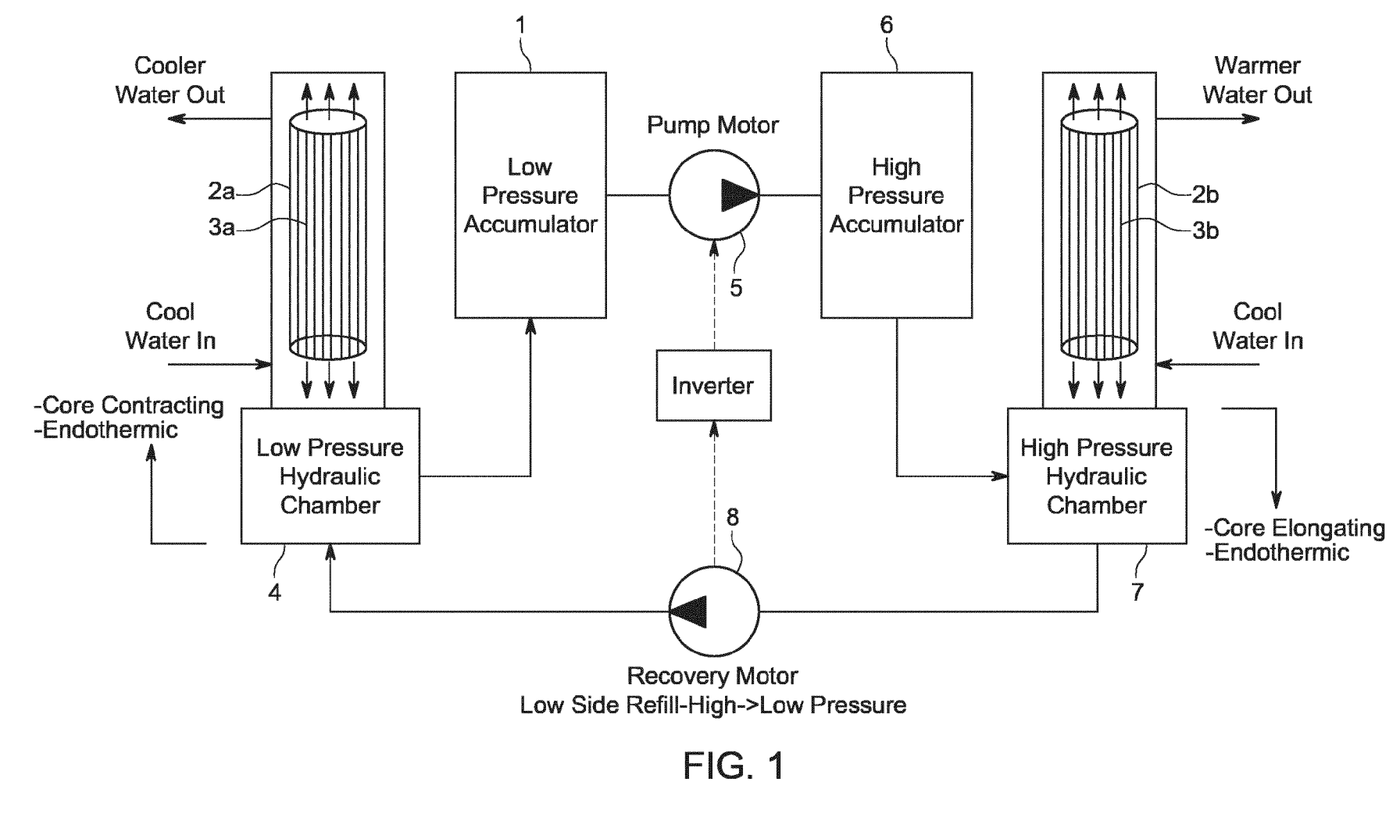
FIG. 1 illustrates a Heat Pump system incorporating a mechanical configuration of SMA or NTE or elastocaloric cores and a transmission system.
Figure 2:
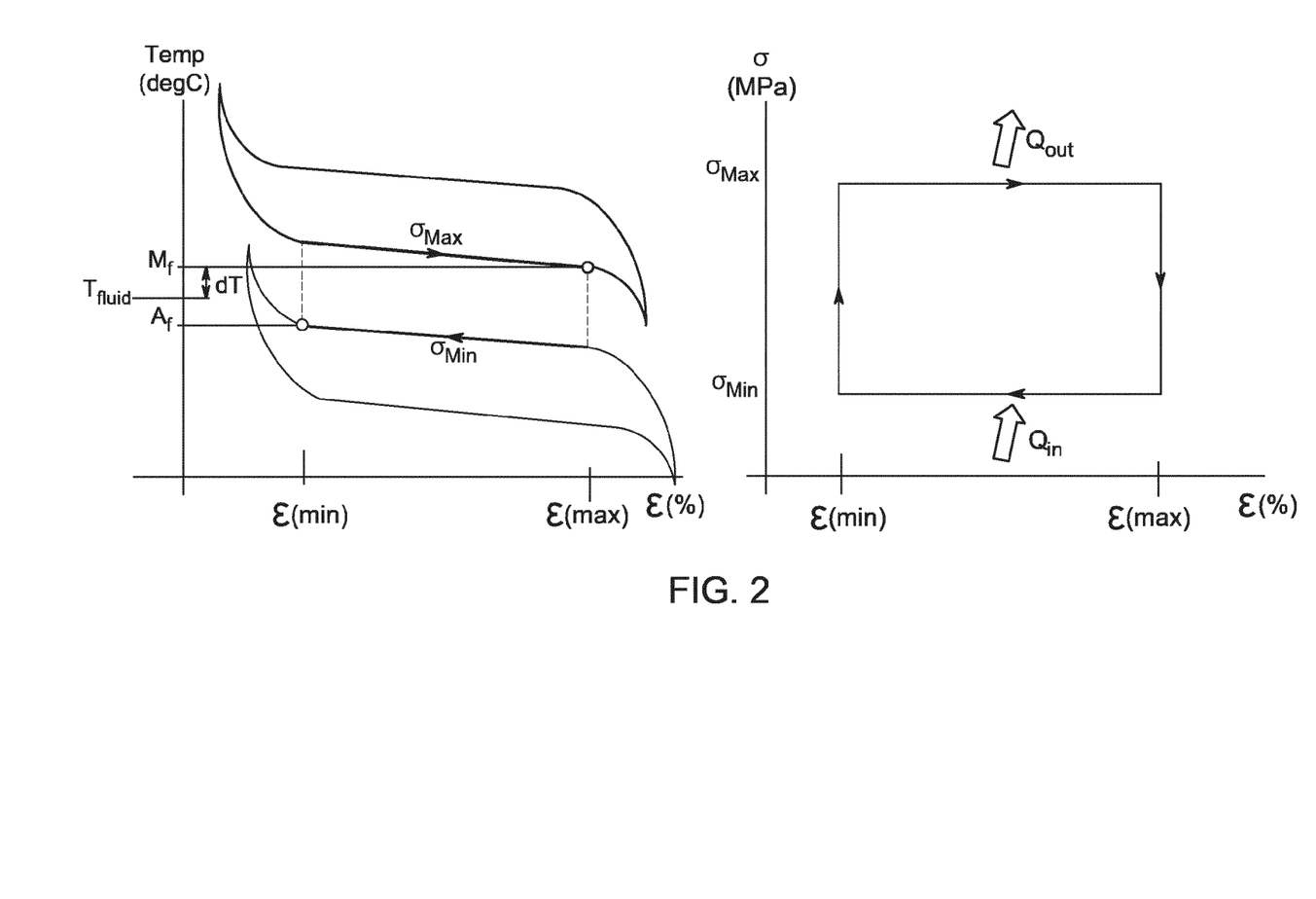
FIG. 2 illustrates a work flow diagram showing different states of the heat pump during operation.

FIG. 1 illustrates a heat pump system incorporating a known SMA drive system configuration but operated in reverse and described in unpublished PCT patent application number PCT/EP2019/052300, assigned to Exergyn Limited, and fully incorporated herein by reference. As shown in FIG. 1 a low-pressure accumulator pressure 1 is applied to a SMA core 2a or bundle in a martensite state. Fluid is input into a chamber housing the SMA core 2a which is at a higher temperature than the $A_s$ and $A_f$, therefore allowing the SMA material to absorb the heat. FIG. 2 illustrates a workflow diagram showing different states of the SMA drive during operation. As a result of a low-pressure applied (and hence low stress) on the wires, both the Austenite start ($A_s$) and Austenite finish ($A_f$) temperatures are lowered proportionally, making a full martensite to austenite transformation easier to achieve with the lower input fluid temperature. The SMA wires in the core are heated to point $A_f$, as shown in FIG. 2. $A_f$ is the point of maximum contraction of the wire by design—representing a partial or full martensite to austenite transformation.

Figure 3:
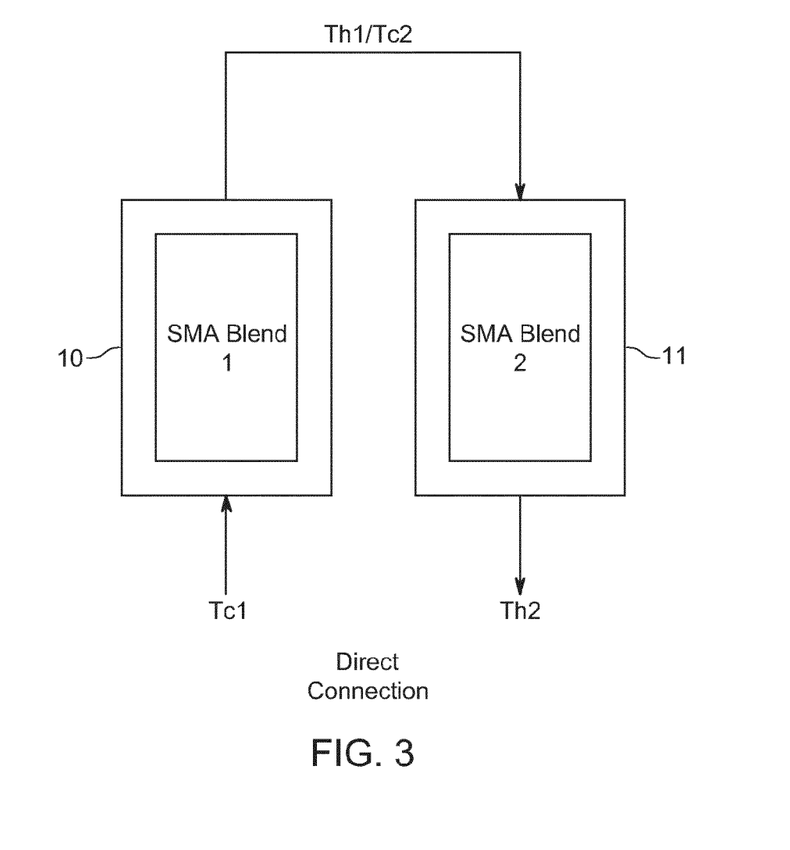
FIG. 3 illustrates an embodiment of the present invention showing a first SMA core and a second SMA core connected in series in a cascade arrangement.

With respect to FIG. 3, FIG. 3 illustrates an embodiment of the present invention shown a first SMA core 10 and a second SMA core 11 connected in series in a cascade arrangement that replaces the core 2a in FIG. 1. In a preferred embodiment of the invention there is provided heat pump system comprising a first Shape-Memory Alloy (SMA) or Negative Thermal Expansion (NTE) or elastocaloric core 10 positioned in a housing and adapted to absorb heat and store energy in response to a first fluid inputted at a first temperature. The housing is configured to receive the first fluid at a first temperature via an inlet to cause the first SMA or NTE or elastocaloric core 10 to change state. A device (not shown) is configured to apply stress on the first SMA or NTE or elastocaloric core 10 in the housing to cause the core 10 to change state in response to a second fluid at a second temperature. The stressing of the core can be provided by a hydraulic circuit, or a pneumatic, a electromechanical or screw thread device arrangement configured to apply a stress to the core. A second Shape-Memory Alloy (SMA) or Negative Thermal Expansion (NTE) or elastocaloric core 11 is positioned in a cascade arrangement with the first core 10 and configured to change state in response to the second fluid temperature.

The cascade of two or more solid-state/SMA cores 10, 11 in a heat pump/chiller/refrigerator system allows for the increase of a temperature lift during heating or temperature drop during cooling/refrigeration (collectively considered to be the system 'deltaT' or dT) to increase the efficiency of the heat pump system. The SMA blend selected for the first and second cores are configured to work together in series and to have different activation temperatures.

For example, in a heat pumping configuration, a blend is selected in Core 10 which can fully phase change/transform to Austenite when exposed to the inlet fluid at a specified "low" temperature during its endothermic cycle. The difference between the Austenite finish temperature and the fluid inlet temperature should be minimised.

Once the SMA has transformed fully to Austenite, the core 10 is exposed to a "low-medium" temperature fluid. In one embodiment a tertiary circuit that continually circulates in the heat pump as a heat carrier can be employed. A load or stress is then applied to the SMA core 10, shifting the activation temperatures of the SMA above that of the tertiary fluid temperature and therefore it releases its heat into it, creating a "medium-hot" tertiary fluid. In a preferred embodiment the load or stress is a compression stress or compression plus lateral stress or compression plus torsional stress. Compression loading is preferred over tension loading as it increases the fatigue life of the material and delivers a more complete phase change transition, thus delivering a much higher efficiency. The stressing of the core can be provided by a hydraulic circuit, pneumatic, electromechanical or screw thread device arrangement configured to apply a stress to the core.

Core 11 operates on the same basis as Core 10, except that the SMA blend, or material properties, is selected with higher activation temperatures compared to Core 10 and is converted to austenite using a tertiary circuit fluid, and not the inlet fluid in a heating arrangement. For a cooling system the activation temperature is lower. The same condition applies in that the difference between the Austenite finish temperature and the tertiary circuit fluid at the inlet should be minimised for optimum performance.

Figure 4:
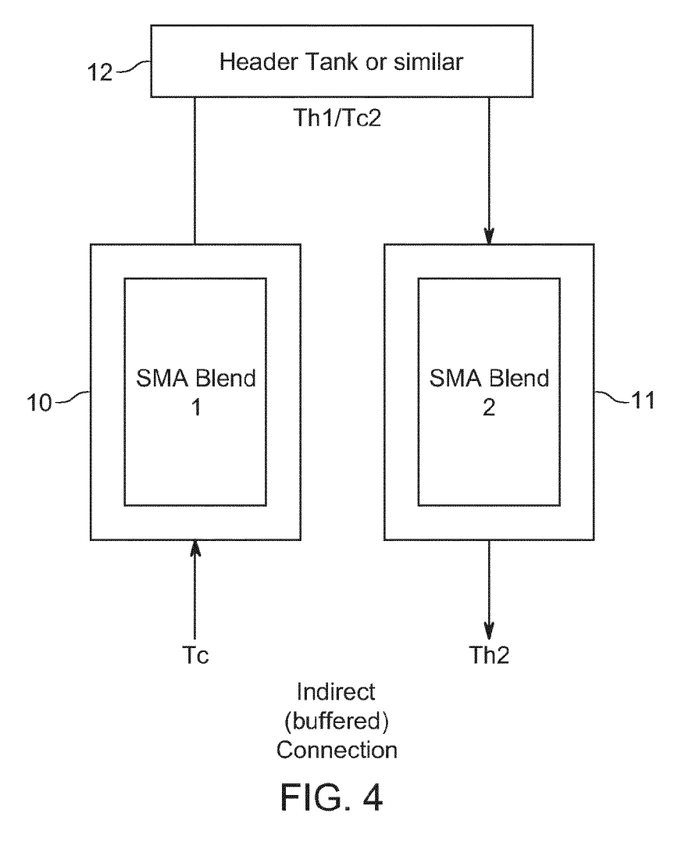
FIG. 4 illustrates a tank circuit or similar device positioned in series between the first core and second core.
Figure 5:
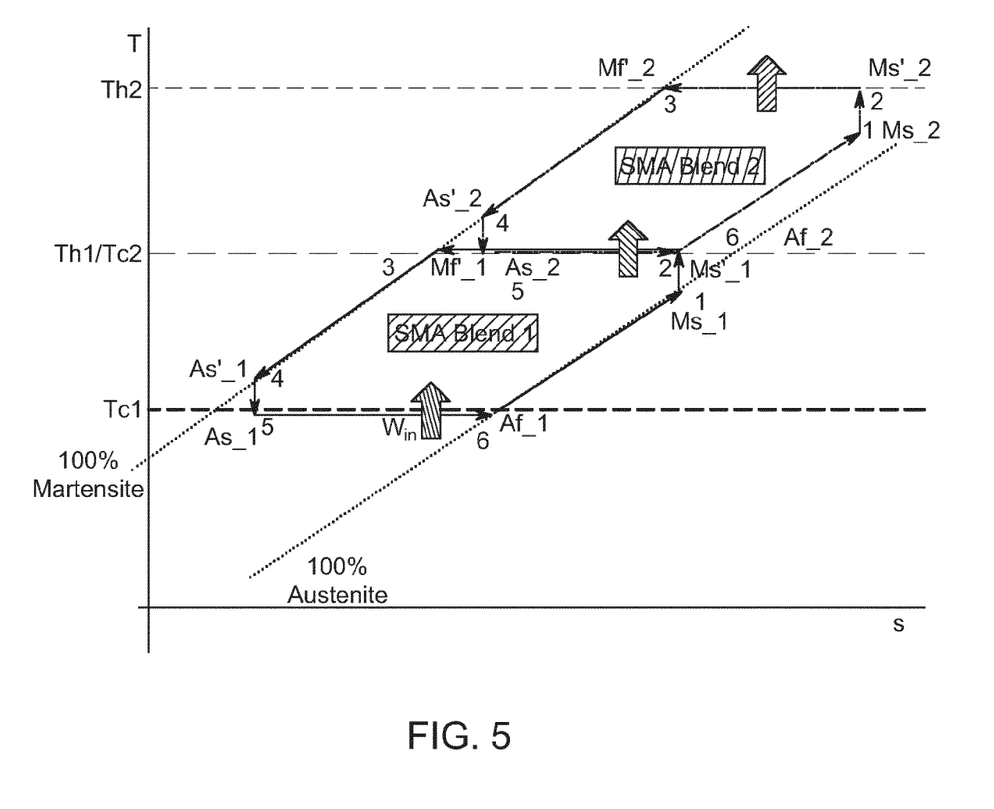
FIG. 5 illustrates an ideal cycle for operation of the invention outlined in the T-s, where the two interacting core blends are arranged in a cascade formation.

FIG. 4 illustrates a tank circuit or similar device 12 positioned in series between the first core and second core. The tank circuit 12 provides an indirect buffered connection to help the efficiency of the cycle. This permits the cores to operate on different timing intervals instead of being directly connected. Another advantage is the homogenisation of the temperature of the fluid before it enters Core 11. Without the buffer tank, the initial input fluid temperature entering into Core 11 could be higher due to the larger temperature gradient initially between the fluid and SMA/NTE core. As the temperatures in Core 10 equalise, the exit fluid temperature entering Core 11 would be lower. This can impact performance. FIG. 5 illustrates an ideal cycle for operation of the invention outlined in the T-s, where the two interacting cores (in this embodiment a SMA blended core) arranged in a cascade formation are shown. The tertiary circuit is shown as Th1/Tc1.

The rate of heat transfer within the core in order to enable the quickest possible transfer of energy from or to the SMA is desirable, and ensure that the minimum temperature difference between the fluid inlet temperature and the austenite finish temperature. This can be achieved in a reasonable time and can be maximised by optimising the first and second core geometry. For example this can be achieved using core geometries that are 3D printed, or by using traditional shapes (rods, tubes etc) and non traditional polygon shapes for making each SMA core.

It will be appreciated that the amount of cascades and cores is not limited, however a balance should be sought between the energy input required to operate the system in cascade against the benefits achieved by doing so, both from a cost and performance perspective.

The heat pump system and method as described herein has many applications and can be used in heating (space heating, heat boilers systems or hot water); cooling (air conditioning water coolers, process cooling), reversible heating and cooling (in buildings or in automotive application); refrigeration (domestic and commercial/retail) cryogenic cooling. The heat pump system and method can effectively be applied to any heating or cooling system.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A heat pump system comprising:
    a first Shape-Memory Alloy (SMA) or Negative Thermal Expansion (NTE) or elastocaloric core positioned in a housing and adapted to absorb heat and store energy in response to a first fluid inputted at a first temperature resulting in a net cooling effect in the first fluid as the first fluid leaves the housing;
    the housing is configured to receive the first fluid at a first temperature via an inlet to cause the first SMA or NTE or elastocaloric core to change state;
    a device is configured to apply stress on the first SMA or NTE or elastocaloric core in the housing to cause the SMA or NTE or elastocaloric core to undergo a phase change and exothermically release heat/energy;
    a second fluid at a second temperature, or the first fluid at the first temperature, is then inputted to the housing, and energy/heat from the first heated SMA or NTE or elastocaloric core is transferred to heat the fluid inputted to the housing; and
    a second Shape-Memory Alloy (SMA) or Negative Thermal Expansion (NTE) or elastocaloric core positioned in a cascade arrangement with the first core and configured to change state in response to the heated fluid from the housing.
2. The heat pump system as claimed in claim 1 wherein the second SMA or NTE or elastocaloric core comprises a higher activation temperature compared to the first SMA or NTE or elastocaloric core to facilitate a greater temperature lift in the fluid output than could be achieved using just one core.
3. The heat pump system as claimed in claim 1 wherein the second SMA or NTE or elastocaloric core comprises a lower activation temperature compared to the first SMA or NTE or elastocaloric core to facilitate a greater temperature drop in the fluid output than could be achieved using just one SMA or NTE or elastocaloric core.
4. The heat pump system as claimed in claim 1 wherein the second fluid comprises a tertiary circuit fluid.
5. The heat pump system as claimed in claim 1 wherein when the first SMA or NTE or elastocaloric core changes state as the second fluid temperature increases such that the second core changes state to increase the temperature of the second fluid.
6. The heat pump system as claimed in claim 1 comprising a third Shape-Memory Alloy (SMA) or Negative Thermal Expansion (NTE) or elastocaloric core positioned in a cascade arrangement with the first SMA or NTE or elastocaloric core and the second SMA or NTE or elastocaloric core.
7. A cooling system comprising:
    a first Shape-Memory Alloy (SMA) or Negative Thermal Expansion (NTE) or elastocaloric core positioned in a housing and adapted to absorb heat and store energy in response to a first fluid inputted at a first temperature resulting in a net cooling effect in the fluid as it leaves the housing;
    the housing is configured to receive the first fluid at a first temperature via an inlet to cause the first SMA or NTE or elastocaloric core to change state at an activation temperature; and
    a second Shape-Memory Alloy (SMA) or Negative Thermal Expansion (NTE) or elastocaloric core positioned in a cascade arrangement with the first SMA or NTE or elastocaloric core and configured to change state in response to the cooled fluid from the first SMA or NTE or elastocaloric core, wherein the activation temperature of the second SMA or NTE or elastocaloric core is lower that the activation temperature of the first SMA or NTE or elastocaloric core.
8. The cooling system as claimed in claim 7 wherein the second SMA or NTE or elastocaloric core is arranged in series with the first SMA or NTE or elastocaloric core provides a temperature drop during a cooling cycle.
9. The cooling system as claimed in claim 7 wherein the second SMA or NTE or elastocaloric core comprises a lower activation temperature compared to the first SMA or NTE or elastocaloric core to facilitate a greater temperature drop in the fluid output than could be achieved using just one SMA or NTE or elastocaloric core.
10. The cooling system as claimed in claim 7 wherein the second fluid comprises a tertiary circuit fluid.
11. The cooling system as claimed in claim 7 wherein when the first SMA or NTE or elastocaloric core changes state the second fluid temperature increases such that the second SMA or NTE or elastocaloric core changes state to increase the temperature of the second fluid.
12. The heat pump system as claimed in claim 7 comprising a third Shape-Memory Alloy (SMA) or Negative Thermal Expansion (NTE) or elastocaloric core positioned in a cascade arrangement with the first SMA or NTE or elastocaloric core and the second SMA or NTE or elastocaloric core.

13. A heating method, the method comprising the steps of:
positioning a first Shape-Memory Alloy (SMA) or Negative Thermal Expansion (NTE) or elastocaloric core in a housing, the first SMA or NTE or elastocaloric core being adapted to absorb heat and store energy in response to a first fluid inputted at a first temperature resulting in a net cooling effect in the first fluid as the first fluid leaves the housing;
configuring the housing to receive the first fluid at a first temperature via an inlet to cause the first SMA or NTE or elastocaloric core to change state;
configuring a device to apply stress on the first SMA or NTE core in the housing to cause the first SMA or NTE or elastocaloric core to undergo a phase change and exothermically release heat/energy;
inputting a second fluid at a second temperature, or the first fluid at the first temperature, to the housing, and energy/heat from the heated first SMA or NTE or elastocaloric core is transferred to heat the fluid inputted to the housing; and
positioning a second Shape-Memory Alloy (SMA) or Negative Thermal Expansion (NTE) or elastocaloric core in a cascade arrangement with the first SMA or NTE or elastocaloric core and configured to change state in response to the heated fluid from the first SMA or NTE or elastocaloric core.

\* \* \* \* \*